Patented Mar. 29, 1932

1,851,361

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC SIDE CHAIN OXIDATION OF AROMATIC COMPOUNDS

No Drawing. Original application filed August 8, 1927, Serial No. 211,638. Divided and this application filed March 30, 1928. Serial No. 266,104.

This invention relates to the catalytic oxidation of the side chains of side chain aromatic compounds, especially in the vapor phase.

According to the present invention side chain aromatic compounds are oxidized, preferably in the vapor phase, to the corresponding aldehydes and acids by causing them to react with an oxidizer, for example an oxidizing gas such as air, in the presence of a new class of catalysts or contact masses, namely, catalysts or contact masses which contain non-silicious base exchange bodies, diluted or undiluted. Some of these new catalysts and contact masses have been described and claimed as products in my application, Serial No. 171,727, filed February 28, 1927, which matured into Patent No. 1,694,620 dated December 11, 1928, of which the present application is in part a continuation. The catalytic oxidation of organic compounds generally by means of catalysts or contact masses containing non-silicious base exchange bodies has been described and claimed broadly in my application, Serial No. 211,638, filed August 8, 1927, which matured into Patent No. 1,735,-763 dated November 12, 1929, of which the present application is a division.

The non-silicious base exchange bodies used in the present invention may be produced by the reaction of metallate components with metal salt components under conditions so that the reaction mixture remains substantially alkaline to litmus. The invention is in no sense restricted to the use of catalysts which are the reaction products of a single metallate and a single metal salt component, and some of the most effective catalysts for use in the present invention are the reaction products of a plurality of metallate components with one or more metal salt components or a plurality of metal salt components with one or more metallate components.

All of the base exchange bodies used in the present invention, that is to say, catalytically active bodies which are prepared by the reaction of a single metallate with a single metal salt or bodies produced by the reaction of at least one metallate with a plurality of metal salts, or vice versa, possess a remarkably porous, frequently microporous structure and in some cases are opalescent. When suitable catalytically active components are present in the products, they form catalysts of remarkable efficiency due probably to the extraordinarily high surface energy of the microscopically porous structures and probably also to the presence of unsaturated valences in many cases and asymmetry of molecules. It is of course possible that the catalytic activity of the products is due partly or wholly also to other reasons, and the present invention is not intended in any sense to be limited by any theory of action of the products. The molecular complexes which are present are apparently of great size and complexity, and the exact chemical constitution has not been determined. In fact it is not even definitely determined whether single chemical compounds are formed in any or all cases and it is possible that molecular mixtures are present. The products possess a physically microscopical homogeneity and behave in many ways as if they were single compounds, and I am of the opinion that probably in many cases the products are in fact single compounds of very high molecular weight, but the invention is not limited to any theories of the chemical constitution of the products.

It should be clearly understood that the products used in the present invention are chemically quite distinct from base exchanging bodies containing silicon, such as for example the zeolites and related base exchange bodies and their derivatives. The present compounds contain no silicon in their structure, and while they share many of the physical properties of zeolites, namely, the highly porous structure and the power of exchanging their alkali cations for other cations by base exchange, they are chemically distinct products. Surprising as it may seem, the presence of silicon, which has hitherto been considered as essential to the formation of the skeletons of such advantageous physical structure, appears to be only one of many elements which are capable of bringing about these physical properties and many of the base exchange bodies of the present invention possess all of the mechanical strength and resistance of the silicious zeolites, properties which are of course of utmost importance in catalytic oxidations of organic compounds.

A number of elements are capable of forming alkali metal metallates, at least in their higher states of oxidation, and can be used singly or in mixtures, as the metallate components for producing base exchange bodies used in the present invention, it being understood of course that the choice will depend on the metal salts to be used and on the catalytic effects which it is desired to produce. Among the elements which form metallates are the following:—aluminum, chromium, zinc, vanadium, beryllium, tin, palladium, platinum, titanium, zirconium, tungsten, uranium, tantalum, boron and molybdenum. The elements which form the metallates may be present in the form of their oxides or hydroxides united with alkali to form simple metallates, or they may be present partly or wholly in the form of complex compounds, such as for example, ammonia complexes, cyanogen complexes, and the like. In general, the complex compounds described in the co-pending application of Jaeger & Bertsch, Serial No. 100,116, filed April 19, 1926, may be used.

The metal salt components include the water soluble neutral or acid salts of the following elements:—copper, silver, gold, beryllium, zinc, cadmium, aluminum, rare earths, titanium, zirconium, tin, lead, thorium, chromium, uranium, vanadium manganese, iron, nickel, cobalt, platinum, palladium, which may be used alone or in any desired mixture. It is an advantage of the present invention that definite proportions of the individual compounds do not need to be used, either because mixtures of different compounds are formed, or more probably because the tremendous size and complexity of the molecule masks any requirements for definite proportions.

All of the products used in the present invention possess base exchanging powers to a greater or less extent when first prepared in solutions which are substantially neutral or alkaline to phenolphthalein. For the oxidation of side chains, however, high base exchanging power of the products is not required and it is therefore possible to depart considerably from the optimum conditions of production as far as base exchange power goes. In other words, the limits of alkalinity, neutrality or acidity are much wider than in the case of products which are to be used for water softening, and which therefore depend primarily on their base exchanging power. While usually the highest base exchanging powers are obtained when the compounds are produced in a reaction mixture which is substantially neutral or alkaline to phenolphthalein products having a similar physical structure and being desirable for the catalytic oxidation of organic compounds can be prepared with somewhat different proportions of the components, so that at the end of the reaction the mixture may possess any alkalinity or acidity between phenolphthalein red and litmus blue as indicator end points.

The possibilities of producing catalysts according to the present invention are not limited to the reaction products of the metallates and metal salt components which may be used and which are present in the molecules in a non-exchangeable form. On the contrary, a further series of products can be prepared by exchanging part or all of the alkali cations for other atoms or radicals by means of base exchange. The number of cations which can be introduced is very large, and some of them are included in the following elements and radicals:—ammonium, copper, silver, gold, beryllium, magnesium, caesium, zinc, strontium, cadmium, barium, mercury, aluminum, thallium, titanium, zirconium, tin, thorium, vanadium, chromium, uranium, manganese, iron, cobalt, nickel, palladium, platinum. These cations may be introduced either singly or in mixtures, simultaneously or successively. The wide possibilities of combination which can be effected by the introduction of various cations by means of base exchange gives the catalytic chemist an almost infinite field of choice in preparing catalysts having just the right degree of activity for organic oxidations and it is an advantage of the present invention that catalysts of exceedingly finely adjusted activity can be produced and are effective. The cations introduced by base exchange may be themselves catalytically active, or they may activate catalytic components which are present in the products in non-exchangeable form. Cations may also be introduced as simple ions or as complex ions. In all cases, the catalytic activity of the products obtained is enhanced by the favorable physical structure of the products.

A further series of products can be obtained by treating the base exchange bodies used in the present invention either with or without the presence of cations introduced by base exchange, with products containing anions which are capable of reacting with the base exchange body to form salt-like products.

In the contact masses containing salt-like bodies which are used in the present invention the catalytically effective components may be present solely in the base exchange body, solely in the anion of the salt-like body, or partly in one and partly in the other. Acid radicals of the following elements, either simple acids, polyacids or complex anions, can be used in producing salt-like bodies with the base exchange bodies of the present invention:—vanadium, tungsten, uranium, chromium, molybdenum, manganese, tantalum, arsenic, phosphorus, bismuth, sulfur, chlorine, platinum, boron. Complex ions, such as for example, ferro and ferricyanogen, sulfocyanogen, metal cyanogen, and the like, may also be used wherever they form salt-like bodies with the base exchange bodies of the present invention. A single acid radical may be introduced, or a mixture may be used, either by a simultaneous or successive treatment. The amount of the acid radical used may also be varied so that the products may possess the character of acid, neutral or basic salts.

While it is possible to use certain of the catalysts of the present invention in an undiluted form, best results are usually obtained by the dilution of the products with more or less inert bodies, or with bodies of relatively feeble catalytic powers or activating powers. Diluents can be incorporated with the catalytically active base exchange body before or after formation, and are preferably although not necessarily, incorporated therewith to produce a physically homogeneous structure. In addition to finely divided carriers, diluted or undiluted catalytically active base exchange bodies can be coated on or impregnated in relatively massive carrier fragments, the incorporation taking place before, during or after formation of the base exchange body. It should be understood of course in all cases that where a perfectly homogeneous product is desired, the incorporation of diluents must take place before the base exchange body after formation has set. Practically all of the base exchange bodies used in the present invention are first formed as gels, in which condition they can be incorporated with diluents or carrier bodies, but after once setting, and particularly after drying, it is of course impossible to incorporate diluents into the base exchange body other than by purely physical mixture, which in general is less desirable, but which is not excluded from the broader aspects of the present invention.

A large number of diluent bodies can be used, such as silicious materials, as kieselguhrs of all kinds, diatomite brick refuse, pumice meal, pulverized quartz, sand, and other minerals, especially those rich in silica. In the same way, a large number of natural or artificial massive carrier fragments can be used, such as fragments of pumice, diatomite bricks or other minerals, metal granules and the like. In general, the methods of incorporation and many of the diluents which can be used are described in the co-pending application of Jaeger and Bertsch, Serial No. 95,771, filed March 18, 1926.

The high porosity of the products which are prepared may be even further increased by incorporating into the framework of the base exchange body products which can be removed by leaching, volatilization or combustion, and which when removed leave additional porous spaces and produce an even more advantageous physical structure. The substances added may be of organic or inorganic nature and may be added as individuals or may be in chemical combination with some of the permanent components. Thus for example, certain of the components may be introduced in the form of complex compounds which are later decomposed and then leave additional porous spaces. Examples of such compounds are certain ammonia complexes which can be decomposed by heating the finished product.

In general, the reaction of the component solutions results in the production of soluble salts which are not wanted, and it is therefore usually desirable to wash the base exchange body, after precipitation and then to dry, or dry first and then wash. I have found that while it is possible in some cases to dry at high temperature, for the best results, in most cases drying temperatures of 100° C., or less, are desirable.

In the general methods described above, separately prepared metallate components and metal salt components have been caused to react. While for many purposes these are the preferred methods, it is possible to prepare base exchange bodies by somewhat different methods. Thus for example, if a solution of a metallate of amphoteric metal is cautiously neutralized with acid, until the strongly alkaline reaction becomes weakly alkaline to phenolphthalein, or even slightly acid with weak alkalinity to litmus, as a limit, base exchange bodies are produced, and in many cases are of importance, particularly for certain side chain oxidation processes. Instead of the metallates, the amphoteric metals may also be present in the form of complex metallate compounds, for example, such complex compounds as are described in the co-pending application of Jaeger & Bertsch, referred to above.

In a similar manner, acid or neutral solutions of salts of amphoteric metals may be treated with alkali until the mixture becomes neutral or alkaline to phenolphthalein, or even acid, in which case base exchange bodies are produced in a manner similar to that described in the foregoing paragraph. The base exchange bodies produced either by neutralizing metallate solutions or metal salt solutions in general do not show quite as great base exchange power as do those which are prepared by causing ready made metallate and metal salt solutions to react with each other. The physical structure, however, appears to be similar and, as in many cases, particularly in certain side chain oxidation processes, extremely high base exchange power is not essential. Many very valuable catalysts can be produced in this manner.

A further wet preparation consists in causing alkali metal salts of the oxygen-containing acids of metal elements of the fifth and sixth group of the periodic system, such as for example, vanadium, molybdenum, tantalum, tungsten, and the like, to react with neutral or acid salts of metals, particularly metals which are strongly amphoteric. Preferably there should be an excess of alkali. The salts of the fifth and sixth group acids may be used alone or in combination with other metallates.

In addition to the wet methods, which for most purposes I find are preferable, base exchange bodies can be produced by fusion methods, for example, by fusing oxides or hydroxides of the metallate and metal salt components with alkali such as, sodium carbonate or potassium carbonate or their hydroxides. The base exchange bodies produced by fusion, while sometimes they do not possess quite as high base exchange powers, are nevertheless of a similar advantageous physical structure, and many of the products are very valuable catalysts. Oxides of the metals of the fifth and sixth groups may also be used to form products somewhat similar to those described in the preceding paragraph by fusion methods.

The non-silicious base exchange catalysts described above contain the catalytically active element or elements in chemical combination with the base exchange body or forming part thereof, and they are among the most effective catalysts used in the present invention. It is not necessary, however, that the catalytic activity should reside in the base exchange body itself, and many very important catalysts can be produced in which catalytically inactive base exchange bodies are united with catalytically active diluents to form physically homogeneous masses. These masses, although they do not contain catalytic elements chemically combined with the base exchange body, of course share its microporous structure, and where suitable catalytically active diluents are used, catalysts of great efficiency are obtained, and are included in the scope of the present invention. Of course the catalytic activity may reside both in the diluents and in the base exchange body.

The catalysts used in the present invention, and particularly diluted catalysts, may in many cases with advantage be given a preliminary treatment consisting in a calcination and exposure to oxidizing or acid vapors at an elevated temperature as described in my prior Patents Nos. 1,678,626 and 1,678,627 dated July 24, 1928. Such treatments frequently produce secondary chemical changes as are produced in the catalyses themselves, and it should be understood that the catalysts of the present invention are defined as to chemical composition as of the time when they are freshly made, in accordance with the usual methods of definition in catalytic chemistry.

Many of the organic reactions which are included in the present invention, and particularly the oxidation of the side chains of many aromatic compounds, require a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some reactions. Other catalytically active or activating substances which are not specific catalysts for the oxidation of side chain aromatic compounds which enhance the effectiveness of the stabilizers, and which are termed stabilizer promoters, may also be used. In fact, whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the particular oxidation reaction may be considered, and act as stabilizer promoters. I do not claim in this application the use of stabilizers or stabilizer promoters in general, as these form the subject-matter of my co-pending application, Serial No. 265,521 filed March 28, 1928. The expressions "stabilizers" and "stabilizer promoters", when used in the present application, are to be understood as used in the sense in which they are defined in the afore-mentioned co-pending application. It should be understood that while many of the base exchange catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds, are to be considered as stabilizer promoters.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular installation in which he is interested.

Example 1

40 parts of $V_2O_5$ are suspended in 500 parts of water and acidified with a little concentrated sulfuric acid. The suspension is heated almost to the boiling point and gases containing $SO_2$ are passed through until the vanadic acid suspension is completely dissolved as blue vanadyl sulfate. Sometimes it is necessary to add some water in order to get the vanadyl sulfate entirely dissolved.

The solution is then divided into two parts, one of which is set aside and the other treated with 5 N. potassium hydroxide solution at 50 to 60° C. until a clear coffee brown solution of potassium vanadite is obtained.

The vanadite solution is mixed with 70 parts of small diatomite brick fragments or 40 parts of "Celite" and 40 parts of quartz particles, the mixture being stirred until it becomes uniform. Other diluent bodies such as neutral silicates, sand, silica gel, ground rocks, tuffs, lava of volcanic or eruptive origin, or similar materials may be used. To the solution containing potassium vanadite the second half of the vanadyl sulfate solution is added, care being taken that even after all of the vanadyl sulfate has been added, the solution remains alkaline or neutral to phenolphthalein. The reaction product, after separation from the mother liquor by filtration and drying at 60 to 70° C. is broken into fragments and constitutes a base exchange body containing potassium and tetravalent vanadium, part of the vanadium playing the part of an acid radical and part that of a base in the non-exchangeable portion of the molecule.

The product obtained is well suited for the catalytic oxidation of toluol to benzaldehyde, chlortoluols, dichlortoluols, chlorbromtoluols, nitro-toluols, chlornitro-toluols, brom-nitro-toluols and the like, to the corresponding substituted benzaldehydes, the vapors of the compounds, mixed with air in the proportion of 1:15 to 1:30 being passed over the catalyst at temperatures of 320 to 440° C.

Example 2

A diluted potassium vanadyl base exchange body is prepared as described in Example 1 and is then sprayed with 3 to 5% inorganic acids such as, for example, sulfuric acid, phosphoric acid, nitric acid, hydrochloric acid or the like until the potassium in the exchangeable part of the base exchange body has been neutralized and a so-called salt-like body is obtained. This salt-like body tends to oxidize toluol and the substituted toluols preferentially to the corresponding benzaldehydes and benzoic acids the acids predominating, the vapors of the compounds being mixed with air in the proportion of 1–20 and passed over the catalyst at temperatures of 360 to 450° C.

Example 3

A diluted or undiluted potassium vanadyl base exchange body, as described in the foregoing examples, is coated onto massive carrier fragments such as, for example, materials rich in silica, as quartz fragments, quartz filter stones, sand stones, fragments of silica gel, diatomaceous stones, celite bricks, pumice fragments, asbestos, fragments of natural or artificial silicates and diluted or undiluted zeolites, metals such as aluminum granules, metal alloys, ferro-silicon, ferro-vanadium, ferro-chrome and the like, particularly where their surface has been roughened.

The coating can be either after formation of the product or the product can be caused to react on the carrier fragments and be generated in situ. Artificial carrier fragments can also be prepared, for example, by forming fragments of "Celite", kieselguhr, pulverized silica gel and silicates, highly absorptive glaucosil, which is the siliceous residue from the acid extraction of green sand, diluted or undiluted zeolites, using various adhesives, such as waterglass, alkalies and alkali metal salts followed, after action by calcination at 400 to 500° C. and if necessary treatment with acids.

When the base exchange body or its salt-like body is coated onto the carrier fragments, as enumerated above, after it has been formed, various adhesives can be used which may be stabilizers or stabilizer promoters for the catalyst. Thus, for example, many acid, alkaline and neutral salts of the alkali-forming metals such as sulfates, chlorides, nitrates, nitrites, waterglass, carbonates, hydroxides and the like can be used.

Instead of introducing diluent bodies into the base exchange body during formation, as described in the foregoing examples, the undiluted base exchange body can be prepared from its components potassium vanadite and vanadyl sulfate, and then mixed mechanically in aqueous suspensions with the diluent bodies or the base exchange body may be dried and pulverized and then mixed with the latter. For example, 50 parts of "Celite Brick" particles may be used and the mixture formed into granules with any of the above described adhesives. A very efficient catalyst is thus produced for the catalytic oxidation of xylenes, mesitylene, pseudocumene and paracymene to the corresponding aldehydes and acids, the vapors of the compounds being mixed with air in the proportion of about 1–20 and passed over the calcined catalyst at temperatures of 340 to 420° C.

Example 4

Base exchange bodies are prepared by using potassium tungstate, potassium chromate, potassium molybdate or potassium tantalate in molecularly equivalent amounts instead of potassium vanadate as in Example 6. These catalysts especially after preliminary treatment with burner gases diluted with air at 450–500° C. are well suited for the oxidation of toluol to benzaldehyde and benzoic acid and substituted toluols to the corresponding aldehydes and acids when the vapors of these products, mixed with air in the proportion of 1:35 by weight, are passed over the contact masses at 340–390° C.

*Example 5*

A vanadyl base exchange body is prepared by suspending 20 parts of $V_2O_5$ in 500 parts of water, adding a little concentrated sulfuric acid and then reducing the $V_2O_5$ with gases containing sulfur dioxide at the boiling point until it is completely transformed into blue vanadyl sulfate. The vanadyl sulfate solution is then divided into two parts, half of which is treated at 50–60° C. with sufficient 5 N. KOH to form a clear coffee-brown solution of potassium vanadite, to which 50 parts of "Celite" earth is added as a diluent. The second half of the original solution is then added with vigorous agitation, care being taken that the alkalinity remains between phenolphthalein red and litmus blue. The gelatinous product is sucked but not dried and constitutes a vanadyl base exchange body.

10.2 parts of freshly precipitated aluminum oxide are brought into solution with 40 parts of 100% KOH in 200 parts of water. The vanadyl base exchange body described above is then stirred into the solution and a 10% aqueous solution containing 37 parts of ferric sulfate with 9 mols of water or 44.4 parts of aluminum sulfate with 18 mols of water or a mixture of the two, is added to the aluminate mixture with vigorous agitation. The reaction product produced, which is an aluminum iron base exchange body and which does not possess effective catalytic properties for the catalytic oxidation of most organic compounds, is diluted with the catalytically active vanadyl base exchange body and is thereby transformed into a highly active catalyst for the above referred to processes. The reaction product is sucked, pressed, washed with 300–400 parts of water, dried and broken into fragments. The fragments may be treated with 5% copper sulfate, silver nitrate, cobalt nitrate or iron nitrate solutions to partly replace the alkali with these metals. The product may also be treated with salts of the metal oxygen acids of the fifth and sixth groups, preferably with a 1% ammonium vanadate solution, resulting in a so-called salt-like body after the soluble components have been washed out.

The products are calcined with air or gases containing carbon dioxide at 400° C. the calcination temperature being permitted to rise gradually in order to prevent undesirable changes in the structure of the base exchange body. After this preliminary calcination the product may be preferably treated with 3–5% burner gases at 450° C. and is then ready for use.

The contact mass so obtained is well suited for the catalytic oxidation of toluol and its substitution products to the corresponding benzaldehydes or benzoic acids. The vapors of the organic compounds, mixed with air or other oxygen containing gases, such as, for example, $CO_2$ and oxygen, in the proportion of from 1:20 to 1:30 are passed over the catalyst at 350–420° C.

In this example the aluminum iron base exchange body may be considered as a complex stabilizer for the catalyst in these reactions. In order to promote or tune the stabilizing action of the catalyst various stabilizer promoters can be added in the form of silicates or heavy metal oxides such as ferric oxide, copper oxide, titanium dioxide, manganese dioxide, zirconium dioxide, cerium dioxide, beryllium oxide, calcium oxide, cobalt oxide or thorium dioxide. They may be added singly or in mixtures and may advantageously be formed in a nascent state. The amount of the stabilizer promoter added depends on the effect desired; in general from 2–5% of such stabilizer promoters gives good results. These stabilizer promoters of course, may be added in the same manner as any other diluent as has been generally described in the introductory portion of this application.

A different method of introducing the stabilizer promoters consists in replacing part or all of the metal salt components of the base exchange body with corresponding amounts of beryllium sulfate, silver nitrate, nickel sulfate, cadmium sulfate or similar mineral acid salts of these bases.

In many cases it is desirable to neutralize excess alkali in the reaction products with 5% mineral acid such as hydrochloric acid, sulfuric acid, nitric acid or the like until the alkalinity has been brought to the desired point. Other catalytically active base exchange bodies, may, of course, be introduced as diluents instead of the one described.

*Example 6*

8 parts of $V_2O_5$ and 5.1 parts $WO_3$ are dissolved in a 2 N. KOH solution containing 26 parts of 90% KOH. 80 parts "Celite Brick" refuse or other acid resistant materials rich in silica are added. 22 parts of $Al_2(SO_4)_3$ 18 aq. are dissolved in about 100 parts of water. The suspension and the solution are mixed together in such a way that the solution is added in small portions whereby care is taken that the reaction mixture remains strongly alkaline to litmus. The paste obtained is freed from the mother liquor by pressing and is dried afterwards at temperatures under 100° C. and then broken in small pieces suitable for catalysis. After drying it may be desirable sometimes to trickle water over the broken fragments in order to wash out the excess of salts formed in the preparation of this body.

The dried diluted base exchanging body containing $V_2O_5$, $WO_3$ and $Al_2O_3$ in non-exchangeable form is advantageously treated at 420 to 500° C. with gases containing $SO_2$ and oxygen in strong dilution and then is blown by air. The contact mass so obtained is well suited for the catalytic oxidation of cresol to salicylaldehyde and salicylic acid; when the compounds mixed with air in the ratio of 1:25 by weight and the mixture is passed over the contact mass at 350 to 440° C.

Instead of using $Al_2(SO_4)_3$ as the salt component of the base exchange body, the equivalent amount of titanium sulfate, zirconium sulfate, cadmium sulfate or their mixtures can be used.

Instead of $WO_3$ $MoO_3$ and $Ta_2O_5$ can be used to prepare contact masses of similar catalytic efficiency.

*Example 7*

6.7 parts of freshly precipitated $Al_2O_3$ are mixed with 12 parts of $V_2O_5$ and sufficient crystallized oxalic acid or other reducing agents, such as powdered carbon, are added in order to reduce the $V_2O_5$ in the process to $V_2O_4$. 11 parts of 100% KOH or 13 parts of $K_2CO_3$ are thoroughly mixed with the other components. The entire mixture is then heated up to the sintering point or to incipient melting. The melted mass is crushed to small pieces and leached with water in order to remove excessive alkali. The catalytically active base exchange body so obtained is ground and then embedded in a catalytically inactive zeolite body as follows:

90 parts of 33° Bé. waterglass are diluted with 5 to 10 volumes of water and the base exchange body obtained, as described above, together with 80 parts of infusorial earth are added with vigorous stirring, in order to obtain a good distribution. 60 parts of aluminum sulfate with 18 mols of water are dissolved in 200 parts of water and sufficient 10 N. potassium hydroxide solution is added to dissolve up the aluminum hydroxide which is at first precipitated, forming a potassium aluminate solution.

The aluminate solution is then stirred into the suspension and the mixture heated up to about 60 to 65° C. A gelatinous precipitate is obtained almost at once and is increased by the gradual addition of 2 N. sulfuric acid. Care should be taken, however, that alkalinity to litmus or neutrality to phenolphthalein is maintained. The stirring is continued for an hour, during which time the mixture is gradually permitted to cool down to room temperature. The gelatinous precipitate obtained is pressed and washed with 200 parts of water in small portions. The filter cake is then dried and broken into fragments of suitable size. The mass so obtained, after careful calcination for purposes of dehydration, constitutes an efficient contact mass, for the catalytic oxidation of organic compounds such as toluol to benzaldehyde and benzoic acid when toluol vapors mixed with air in the ration of 1:25 weight are passed over the contact mass at 360 to 380° C. It is sometimes advantageous to add superheated steam to the gaseous reaction mixture before passing over the contact mass.

In most of the examples the metal salt solution is added to the metallate solution, and this may be considered as the preferred method for producing nonsilicious base exchange bodies used as contact masses in the present invention, but it should be understood that the invention is not limited to the use of contact masses or catalysts produced by this preferred procedure. On the contrary, some valuable contact masses may be produced by the converse procedure, in which the metallate solution is added to the metal salt solution. As in this case the relatively alkaline solution is added to the relatively acid solution it is impossible to maintain continuously an alkaline reaction. Care must of course be taken that in all cases after the reaction is completed the mixture shows alkalinity to litmus, and preferably a neutrality or alkalinity to phenolphthalein.

What is claimed as new is:

1. A method of oxidizing the side chains of side chain aromatic compounds, which comprises causing the compounds to react with an oxidizing gas in the presence of a contact mass containing a non-silicious base exchange body.

2. A method of oxidizing the side chains of side chain aromatic compounds, which comprises causing the vapors of the compounds admixed with an oxidizing gas to react in the presence of a contact mass containing a non-silicious base exchange body.

3. A method of oxidizing the side chains of side chain aromatic compounds, which comprises causing the vapors of the compounds admixed with an oxidizing gas to react in the presence of a contact mass containing a diluted non-silicious base exchange body.

4. A method of oxidizing the side chains of side chain aromatic compounds, which comprises causing the vapors of the compounds admixed with an oxidizing gas to react in the presence of a contact mass containing a non-silicious base exchange body, at least one catalytically active component of the contact mass being chemically combined in or with the non-silicious base exchange body.

5. A method of oxidizing the side chains of side chain aromatic compounds, which comprises causing the vapors of the compounds admixed with an oxidizing gas to react in the presence of a contact mass containing a non-silicious base exchange body, at least one catalytically active component of the contact mass being chemically combined in or with the non-silicious base exchange body in non-exchangeable form.

6. A method of oxidizing the side chains of side chain aromatic compounds, which comprises causing the vapors of the compounds admixed with an oxidizing gas to react in the presence of a contact mass containing a diluted non-silicious base exchange body, at least one catalytically effective component of the contact mass being physically associated with the non-silicious base exchange body in the form of a diluent.

7. A method of oxidizing the side chains of side chain aromatic compounds, which comprises causing the vapors of the compounds admixed with an oxidizing gas to react in the presence of a contact mass containing a non-silicious base exchange body, the contact mass also containing at least one compound of an element included within the group alkali metals, alkaline earth metals.

8. A method of oxidizing the side chains of side chain aromatic compounds, which comprises causing the vapors of the compounds admixed with an oxidizing gas to react in the presence of a contact mass containing a non-silicious base exchange body, the contact mass also containing at least one compound of an element included within the group alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds.

9. A method of oxidizing the side chains of side chain aromatic compounds, which comprises causing the vapors of the compounds admixed with an oxidizing gas to react in the presence of a contact mass containing a non-silicious base exchange body, the contact mass also containing at least one compound of an element included within the group alkali metals, alkaline earth metals chemically combined in the non-silicious base exchange body.

10. A method of oxidizing the side chains of side chain aromatic compounds, which comprises causing the vapors of the compounds admixed with an oxidizing gas to react in the presence of a contact mass containing a non-silicious base exchange body, the contact mass also containing at least one compound of an element included within the group alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds chemically combined in or with the non-silicious base exchange body.

11. A method of oxidizing the side chains of side chain aromatic compounds, which comprises causing the vapors of the compounds admixed with an oxidizing gas to react in the presence of a contact mass containing a non-silicious base exchange body, the contact mass containing an oxycompound of vanadium as at least one of its catalytically active components.

12. A method of oxidizing the side chains of side chain aromatic compounds, which comprises causing the vapors of the compounds admixed with an oxidizing gas to react in the presence of a contact mass containing a non-silicious base exchange body in which chemically combined vanadium is present.

13. A method of oxidizing the side chains of benzene homologue compounds, which comprises subjecting them to reaction with an oxidizing gas in the presence of a contact mass containing a non-silicious base exchange body.

14. A method of oxidizing the side chains of benzene homologue compounds, which comprises causing the vapors of the compounds to react with an oxidizing gas in the presence of a contact mass containing a non-silicious base exchange body.

15. A method of oxidizing the methyl group of benzene homologue compounds containing at least one methyl group, which comprises causing the compounds to react with an oxidizing gas in the presence of a catalyst containing a non-silicious base exchange body.

16. A method of oxidizing the methyl groups of benzene homologue compounds containing at least one methyl group, which comprises causing the vapors of the compounds to react with an oxidizing gas in the presence of a contact mass containing a non-silicious base exchange body.

17. A method of oxidizing the side chains of toluene compounds which comprises causing the compounds to react with an oxidizing gas in the presence of a catalyst containing a non-silicious base exchange body.

18. A method of oxidizing the side chain of toluene compounds, which comprises causing the vapors of the toluene compounds admixed with an oxidizing gas to react in the presence of a contact mass containing a non-silicious base exchange body.

19. A method of oxidizing the side chain of toluene, which comprises causing toluene to react with an oxidizing gas in the presence of a catalyst containing a non-silicious base exchange body.

20. A method of oxidizing the side chain of toluene, which comprises causing the vapors of toluene admixed with an oxidizing gas to react in the presence of a contact mass containing a non-silicious base exchange body.

Signed at Pittsburgh, Pennsylvania, this 23rd day of March, 1928.

ALPHONS O. JAEGER.